(12) United States Patent
Nojiri

(10) Patent No.: US 11,590,834 B2
(45) Date of Patent: Feb. 28, 2023

(54) GLASS RUN

(71) Applicant: TOYODA GOSEI CO., LTD., Kiyosu (JP)

(72) Inventor: Masatoshi Nojiri, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 86 days.

(21) Appl. No.: 16/809,963

(22) Filed: Mar. 5, 2020

(65) Prior Publication Data

US 2020/0307364 A1 Oct. 1, 2020

(30) Foreign Application Priority Data

Mar. 26, 2019 (JP) .............................. JP2019-057992
Aug. 20, 2019 (JP) .............................. JP2019-150295

(51) Int. Cl.
*B60J 10/76* (2016.01)
*B60J 5/04* (2006.01)
*B60J 10/763* (2016.01)
*B60J 10/767* (2016.01)

(52) U.S. Cl.
CPC ............. *B60J 10/76* (2016.02); *B60J 5/0402* (2013.01); *B60J 10/763* (2016.02); *B60J 10/767* (2016.02)

(58) Field of Classification Search
CPC ........ B60J 10/76; B60J 10/763; B60J 10/767; B60J 10/50; B60J 5/0402
See application file for complete search history.

(56) References Cited

U.S. PATENT DOCUMENTS

| | | | | |
|---|---|---|---|---|
| 6,389,754 | B2 * | 5/2002 | Nozaki | ..................... B60J 10/16 49/441 |
| 6,668,489 | B2 * | 12/2003 | Baba | ........................ B60J 10/24 49/498.1 |
| 9,327,584 | B2 * | 5/2016 | Dosaki | ..................... B60J 10/76 |
| 10,406,902 | B2 * | 9/2019 | Masumoto | ............... B60J 10/50 |
| 10,603,996 | B2 * | 3/2020 | Mizutani | ............... E06B 7/2312 |
| 10,611,223 | B2 * | 4/2020 | Nishikawa | ............... B60J 10/74 |

(Continued)

FOREIGN PATENT DOCUMENTS

| | | | |
|---|---|---|---|
| EP | 1241037 A1 * | 9/2002 | ............ B60J 10/277 |
| JP | S54-041010 U | 8/1979 | |

(Continued)

OTHER PUBLICATIONS

Office Action dated Jul. 19, 2022, in the corresponding Japanese Patent Application No. 2019-150295 (and English machine translation).

*Primary Examiner* — Marcus Menezes
(74) *Attorney, Agent, or Firm* — Posz Law Group, PLC

(57) ABSTRACT

A glass run includes at least one of: an exterior sub-lip formed so as to project obliquely from an interior side of the exterior side wall that is closer to the bottom wall than a base portion of the exterior seal lip; an interior sub-lip formed so as to project obliquely in a direction toward a base portion of the interior seal lip from an exterior side of the interior side wall that is closer to the bottom wall than the base portion of the interior seal lip, the interior sub-lip formed with a thick portion on a base portion on a side of the interior seal lip; a thick portion formed on a base portion of the exterior seal lip; or a thick portion formed on a side of the interior seal lip that is not in contact with the door glass.

5 Claims, 11 Drawing Sheets

(56) References Cited

U.S. PATENT DOCUMENTS

| | | | | |
|---|---|---|---|---|
| 2001/0001916 A1* | 5/2001 | Nozaki | ................... | B60J 10/17 |
| | | | | 49/414 |
| 2002/0129558 A1* | 9/2002 | Baba | ................... | B60J 10/7775 |
| | | | | 49/498.1 |
| 2007/0251152 A1* | 11/2007 | Takase | ................... | B60J 10/74 |
| | | | | 49/441 |
| 2009/0071077 A1* | 3/2009 | Takase | .................. | B60J 10/277 |
| | | | | 49/489.1 |
| 2012/0079772 A1* | 4/2012 | Mine | ....................... | B60J 10/76 |
| | | | | 49/490.1 |
| 2015/0082709 A1* | 3/2015 | Dosaki | ................... | B60J 10/50 |
| | | | | 49/490.1 |
| 2015/0089878 A1 | 4/2015 | Otsuka et al. | | |
| 2017/0136861 A1* | 5/2017 | Kojima | ................. | B60J 5/0402 |
| 2018/0022196 A1* | 1/2018 | Masumoto | .............. | B60J 10/76 |
| | | | | 49/428 |
| 2018/0266173 A1* | 9/2018 | Mizutani | ............... | B60J 10/50 |
| 2019/0061486 A1* | 2/2019 | Sugawa | ................... | B60J 10/26 |
| 2019/0176600 A1* | 6/2019 | Shigemura | ............ | B60J 10/277 |
| 2019/0232771 A1* | 8/2019 | Robison | .................... | B60J 10/76 |
| 2019/0232772 A1* | 8/2019 | Otsuka | .................... | B60J 10/76 |
| 2020/0101828 A1* | 4/2020 | Oshima | ................. | B60J 5/0402 |
| 2020/0317037 A1* | 10/2020 | Yang | ................... | B29C 48/0019 |
| 2021/0078390 A1* | 3/2021 | Kamitani | ................ | B60J 10/50 |

FOREIGN PATENT DOCUMENTS

| | | | | |
|---|---|---|---|---|
| JP | H04-274925 A | | 9/1992 | |
| JP | 2009269554 A | * | 11/2009 | ............. B60J 10/76 |
| JP | 2015-067109 A | | 4/2015 | |
| JP | 2018-114798 A | | 7/2018 | |
| JP | 2018-149984 A | | 9/2018 | |
| WO | WO-2009077370 A1 | * | 6/2009 | ............. B60J 10/76 |

* cited by examiner

GLASS RUN

CROSS-REFERENCE TO RELATED APPLICATIONS

This application is based upon and claims the benefit of priority from prior Japanese patent application No. 2019-057992, filed on Mar. 26, 2019 and Japanese patent application No. 2019-150295, filed on Aug. 20, 2019, the entire contents of which are incorporated herein by reference.

TECHNICAL FIELD

The present invention relates to a glass run that is attached to a door frame formed on a door of a vehicle.

BACKGROUND ART

On a door of a vehicle, a door frame is provided on an upper portion of a door body, a channel-shaped glass run is fitted and locked into a groove portion formed on an inner peripheral edge of the door frame, and lifting and lowering of a door glass is guided by glass seal portions inside and outside the vehicle of the glass run, so as to seal an inside and an outside of a compartment from each other.

The glass run includes a basic frame (body portion) configured with: a bottom wall, an exterior side wall located on an exterior side of the bottom wall, and an interior side wall located on an interior side of the bottom wall. The glass run further includes an exterior seal lip and an interior seal lip that respectively extend from tip ends of the side wall portions or the vicinity thereof toward an inner side of the body portion. Further, the glass run is attached to an attachment portion provided along an inner periphery of the door frame, and is sealed by the two seal lips so that peripheral edge portions of inner and outer surfaces of the door glass to be lifted and lowered are sandwiched. The glass run also functions to support the peripheral edge portion of the door glass so as to guide the lifting and lowering of the door glass and to prevent rattling of the door glass.

In a state where the door glass is positioned slightly below a fully closed position, the door glass is likely to be displaced in an interior direction. When an automobile travels on a rough road in this state and the door glass vibrates in interior and exterior directions, the door glass and the seal lips may be instantaneously separated from one another, and when the door glass and the seal lips are brought into contact again from the separated state and are separated and brought into contact repeatedly, the contact may cause abnormal noise (tapping noise). In particular, when the seal lips deteriorate with time and an elastic force thereof decreases, a problem becomes significant that when the door glass vibrates, the seal lips are likely to be separated from the door glass, which causes abnormal noise.

As a technique for solving the above problem, for example, a technology described in Patent Document 1 described below is available. A structure of the glass run of Patent Document 1 will be described with reference to FIGS. 1 and 11. FIG. 1 is a front view of a left front door 100 of an automobile as viewed from the exterior side. A door frame 320 is attached to an upper portion of a door body 210 constituting the front door 100. A window opening is formed by the door frame 320 and an upper end edge of the door body 210. A glass run 110 is mounted on an inner peripheral edge of the window opening and inside the door body 210 so as to guide lifting and lowering operation of a door glass 600.

FIG. 11 shows a vertical cross section (a Y-Y cross section in FIG. 1) of a vertical frame portion of the door frame 320. The glass run 110 is formed into a channel shape (a U-shaped cross section) with a bottom wall 200, an exterior side wall 300, and an interior side wall 400 as a basic frame. The exterior side wall 300 is formed with an exterior seal lip 310 that is in contact with an outer surface (exterior side) of the door glass 600, and a tip end of the interior side wall 400 is integrally formed with an interior seal lip 410 that is in contact with an inner surface (interior side) of the door glass 600. A sub-lip 430 projected in a direction opposite to the interior seal lip 410 is formed between the interior seal lip 410 and the bottom wall 200 toward the exterior side.

The interior seal lip 410 includes the protrusion 440 on the inner surface thereof thereby including a projection surface 450 at a position projecting from a general surface of the inner surface. The door glass 600 is configured to be able to, when the door glass 600 is displaced from a reference position to the interior side, change a state between a first support state where the tip end portion of the sub-lip 430 extending from the interior side wall 400 and the projection surface 450 are in contact and slide against each other, and a second support state where the tip end portion of the sub-lip 430 is detached from the projection surface 450 and a portion of the sub-lip 430 that is closer to a base side than the tip end portion in contact with the protrusion 440.

As a result, the protrusion 440 is provided on the inner surface side of the interior seal lip 410, the interior seal lip 410 at that portion is thick, and the sub-lip 430 that extends from the interior side wall 400 and is contactable with the projection surface 450 of the protrusion 440 is provided. Therefore, a force pressing the interior seal lip 410 against the door glass 600 is increased, and even when the door glass 600 vibrates, it is possible to prevent a situation that the interior seal lip 410 is instantaneously separated from the door glass 600, and for example, when the interior seal lip 410 and the door glass 600 are brought in contact with each other from the separated state, it is possible to prevent a situation that abnormal noise (tapping noise) is caused by the contact.

Patent Document 1: JP-A-2018-149984

In the technique disclosed in Patent Document 1 described above, due to the contact between the protrusion 440 having the projection surface 450 and the sub-lip 430 on the inner surface of the interior seal lip 410, the interior seal lip 410 is prevented from being separated from the door glass 600 when the door glass 600 vibrates, whereas the deterioration over time occurs not only to the interior seal lip 410 but also to the sub-lip 430. Therefore, there is a concern that due to a decrease in a reaction force (pressing force) toward the inner surface side of the interior seal lip 410 caused by the deterioration of the sub-lip 430, the interior seal lip 410 is separated from the door glass 600, which causes abnormal noise again.

On the other hand, in a state where the door glass 600 is positioned slightly below the fully closed position, the door glass 600 is likely to be displaced in an interior direction, so that the force that the exterior seal lip 310 presses the door glass 600 is weakened. Therefore, when the door glass 600 vibrates, the door glass 600 and the exterior seal lip 310 may be instantaneously separated from one another, and when the door glass 600 and the exterior seal lip 310 are brought into contact again from the separated state and are separated and brought into contact repeatedly, the contact may cause abnormal noise (tapping noise). However, this problem cannot be solved in Patent Document 1.

Further, since a vehicle includes various forms such as a size of the vehicle and shape and size of the door glass, a solution to the abnormal sound generated between the door glass and the seal lips of the glass run must be considered from the aspects of both the exterior seal lip and the interior seal lip. Moreover, the consideration must involve the cost without affecting other functions of the glass run.

SUMMARY OF INVENTION

According to an aspect of the invention, there is provided a glass run including: a basic frame having a bottom wall, an exterior side wall, and an interior side wall; an exterior seal lip formed at or in the vicinity of a tip end of the exterior side wall; and an interior seal lip formed at or in the vicinity of a tip end of the interior side wall, the glass run configured to be attached to a groove portion formed in a door frame, the glass run comprising at least one of: an exterior sub-lip formed so as to project obliquely from an interior side of the exterior side wall that is closer to the bottom wall than a base portion of the exterior seal lip; an interior sub-lip formed so as to project obliquely in a direction toward a base portion of the interior seal lip from an exterior side of the interior side wall that is closer to the bottom wall than the base portion of the interior seal lip, the interior sub-lip formed with a thick portion on a base portion on a side of the interior seal lip; a thick portion formed on a base portion of the exterior seal lip; or a thick portion formed on a side of the interior seal lip that is not in contact with the door glass.

DESCRIPTION OF EMBODIMENTS

Figure 1:
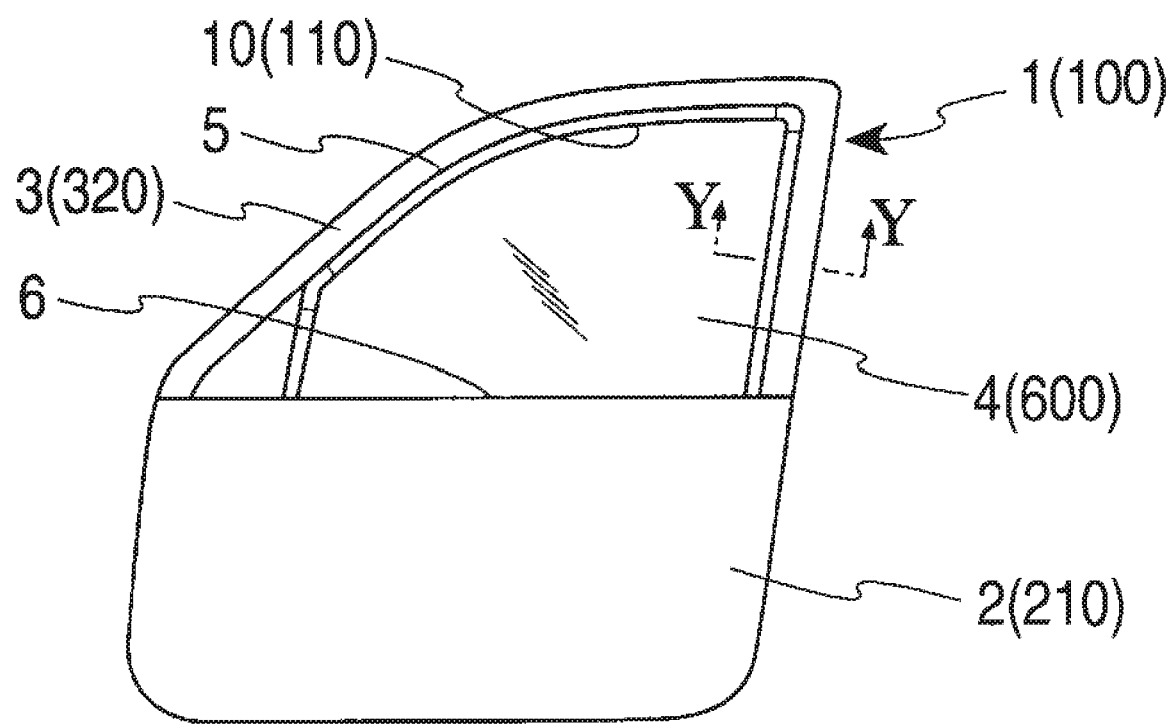
FIG. 1 is a side view of an automobile door.

A first embodiment of the present invention will be described with reference to FIGS. 1 to 3. FIG. 1 is a front view of a left front door 1 of an automobile as viewed from the exterior side. A door frame 3 is attached to an upper portion of a door body 2 constituting the front door 1. A window opening is formed by the door frame 3 and an upper end edge of the door body 2. A glass run 10 is attached to an inner peripheral edge of the window opening and inside the door body 2 so as to guide lifting and lowering operation of a door glass 4. The present invention is applicable not only to the left front door 1 but also to a right front door and left and right rear doors. The present invention is also applicable to a sliding door whose door glass can be lifted and lowered.

Figure 2A:
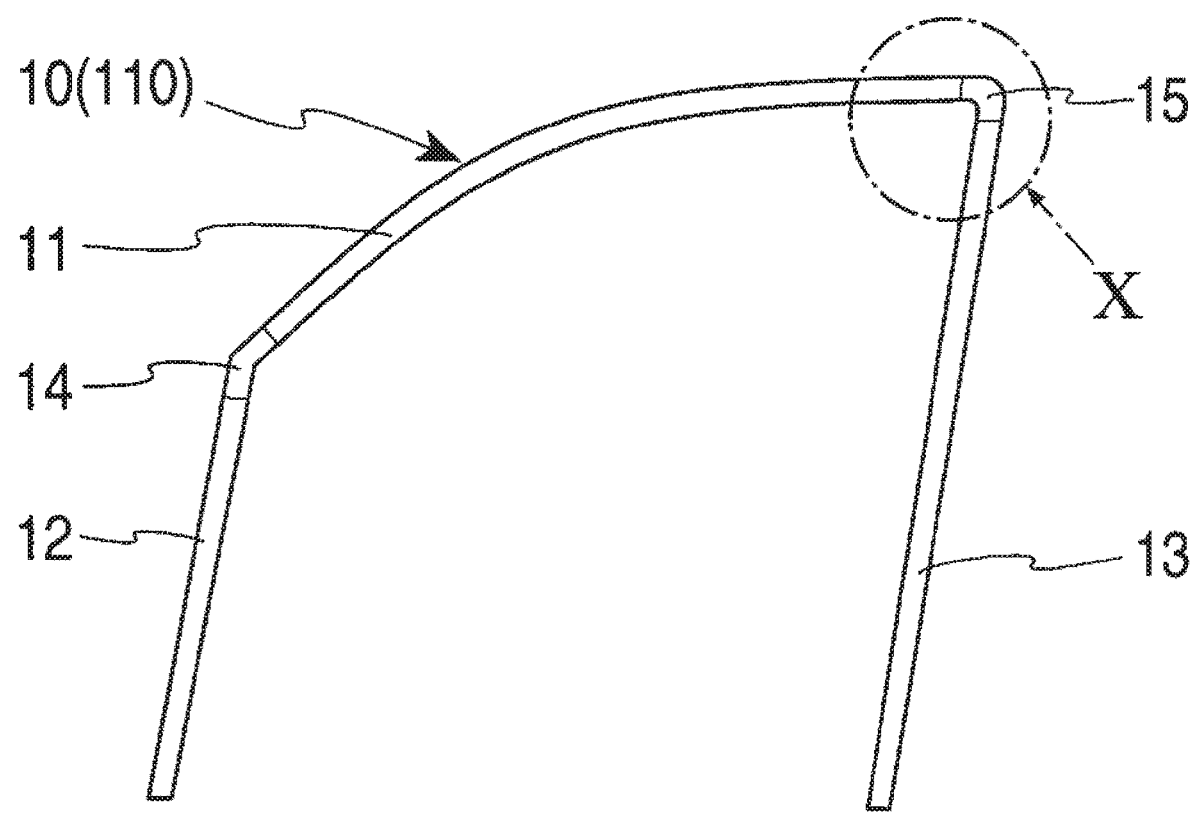
FIG. 2A is a front view showing a glass run used in a door frame of FIG. 1.

FIG. 2A is a simplified front view of only the glass run 10 as viewed from the exterior side. The glass run 10 includes a first extruded portion 11 corresponding to a horizontal frame portion of the door frame 3, a second extruded portion 12 corresponding to a vertical frame portion on the front side of the front door 1, and a third extruded portion 13 corresponding to a vertical frame portion on the rear side. A front end portion of the first extruded portion 11 is connected to an upper end portion of the second extruded portion 12 by a first molded portion 14. A rear end portion of the first extruded portion 11 is connected to an upper end portion of the third extruded portion 13 by a second molded portion 15.

Here, a case between the door glass 4 and the glass run 10 will be described where, the automobile runs on a rough road or the like with the door glass 4 positioned slightly below the fully closed position, and the door glass 4 vibrates in interior and exterior directions. When the door glass 4 is lifted to an uppermost position and is completely closed, the door glass 4 is in contact with the first extruded portion 11, the second extruded portion 12 corresponding to the vertical frame portion on the front side of the front door 1, and the third extruded portion 13 corresponding to the vertical frame portion on the rear side of the glass run 10 so as to be supported in three directions, so that the door glass 4 does not vibrate in the interior and exterior directions even when traveling on a rough road.

When the door glass is slightly lowered and the contact with the first extruded portion 11 is released, the door glass 4 is mainly in contact with the second extruded portion 12 corresponding to the vertical frame portion on the front side and the third extruded portion 13 corresponding to the vertical frame portion on the rear side of the front door 1 so as to be supported in two directions. At this time, when the automobile travels on a rough road or the like, the door glass 4 may vibrate in the interior and exterior directions, which generates the aforementioned problem of abnormal noise.

When the door glass 4 is lowered, in a relationship between the door glass 4 and the glass run 10, the door glass 4 is still in contact with the second extruded portion 12 corresponding to the vertical frame portion on the front side and the third extruded portion 13 corresponding to the vertical frame portion on the rear side of the front door 1 so as to be supported in two directions, whereas the door glass 4 is supported by, for example, a belt line weather strip attached to a belt line 6 of the front door 1 so as to be supported substantially in three directions. Therefore, at this stage, even when traveling on a rough road or the like, the vibration of the door glass 4 in the interior and exterior directions is extremely small.

Therefore, the present invention produces a high effect when applied to a section from the time when the door glass 4 is lowered and is released from the contact with the first extruded portion 11 of the glass run 10 until the door glass 4 becomes also supported by, for example, the belt line weather strip attached to the belt line 6 of the front door 1 and becomes substantially supported in three directions including the glass run 10, that is, in a section in which the support of the door glass 4 is mainly in two directions due to the contact with the second extruded portion 12 corresponding to the vertical frame portion on the front side of the front door 1 and the third extruded portion 13 corresponding to the vertical frame portion on the rear side of the glass run 10.

Figure 2B:
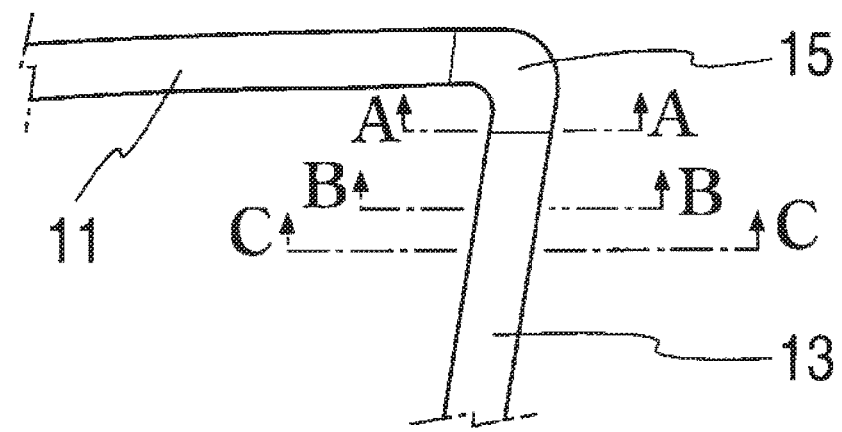
FIG. 2B is an enlarged view of a portion X of FIG. 2A.
Figure 3:
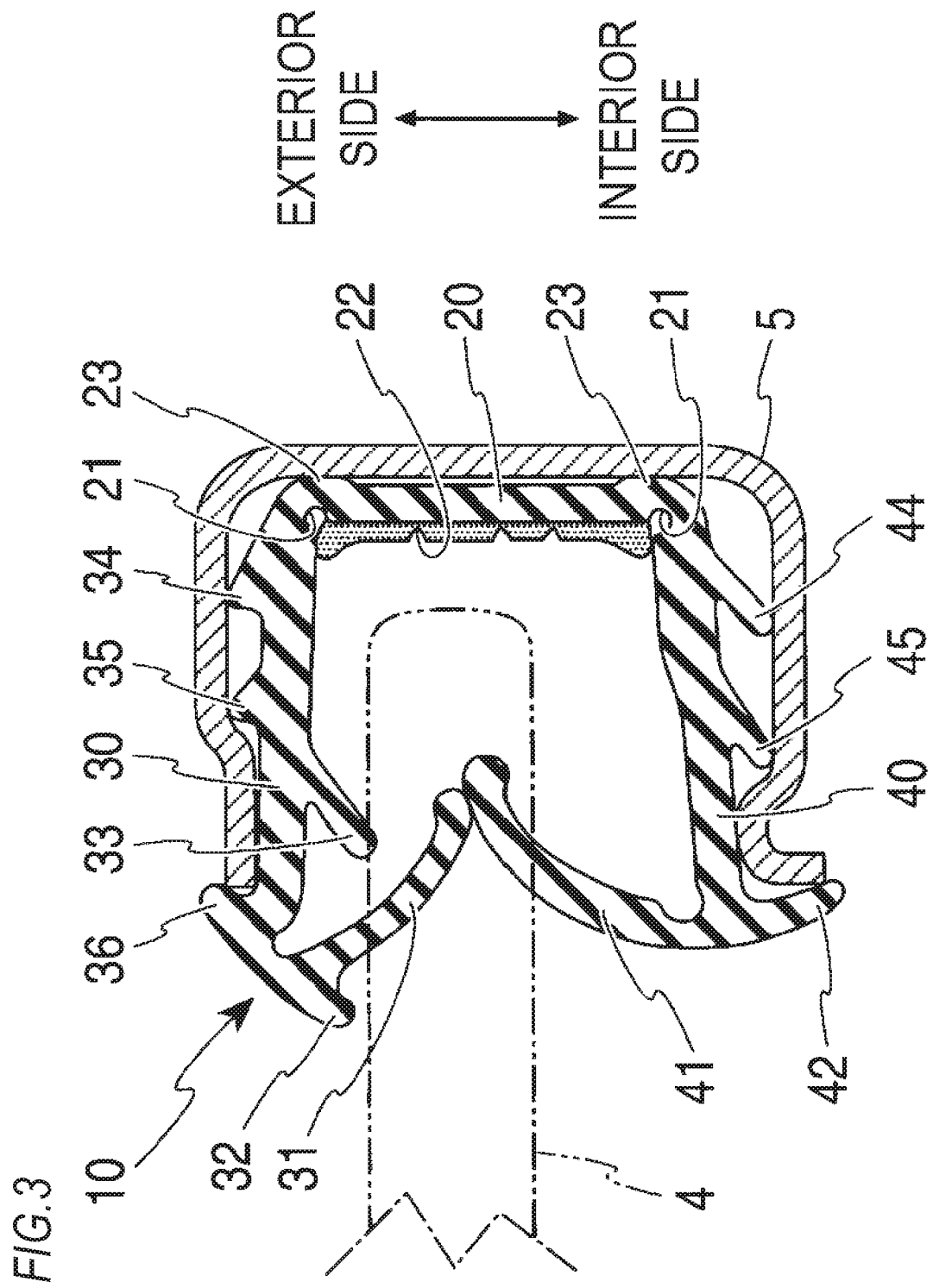
FIG. 3 is a cross-sectional view corresponding to line A of FIG. 2B, which is a glass run according to a first embodiment of the present invention.

FIG. 3 is a cross-sectional view corresponding to line A-A in FIG. 2B, and is in the vicinity of a connection portion between the vertical frame portion on the rear side of the second molded portion 15 and the corresponding third extruded portion 13. The glass run 10 is formed into a channel shape (a substantially U-shaped cross section) with a bottom wall 20, an exterior side wall 30, and an interior side wall 40 as a basic frame.

The bottom wall 20 is formed in a substantially plate shape, and a plurality of bottom wall concave portions 22 are formed in parallel in a manner continuous in a longitudinal direction on an inner surface of the bottom wall 20 (a contact side with the door glass 4). Convex portions 23, 23 formed on the portions the bottom wall 20 opposite to the groove portions 21, 21 are in contact with the door channel 5.

An exterior seal lip 31 that is in contact with the door glass 4 is formed on the interior side of the exterior side wall 30 toward the bottom wall 20, and an exterior cover lip 32 is formed at a tip end portion of the exterior side wall 30 toward a side opposite to the exterior seal lip 31. Since the exterior cover lip 32 can double seal an exterior surface of the door glass 4 together with the exterior seal lip 31, it is possible to prevent rainwater, dust, and noise from entering, thereby improving sealing performance.

An exterior sub-lip 33 projecting obliquely from the interior side toward a side opposite to the bottom wall 20 is formed closer to the bottom wall 20 than the exterior seal lip 31 formed at the tip end of the exterior side wall 30. When the exterior seal lip 31 is in sliding contact with the door glass 4, the exterior sub-lip 33 is in contact with the inner surface (exterior side) of the exterior seal lip 31. The exterior sub-lip 33 may be formed so as to project obliquely toward the bottom wall 20.

On the other hand, an exterior holding rib 34 and an exterior contact rib 35 that are engaged with the door channel 5 which has an arc-shaped curved portion are formed on the exterior side of the exterior side wall 30. Further, on a base portion of the exterior seal lip 31 and the exterior cover lip 32, a locking portion 36 is formed toward the exterior side so as to fix an end portion of the door channel 5.

An interior seal lip 41 that is in contact with the door glass 4 is formed at a tip end of the interior side wall 40 toward the bottom wall 20. An interior holding rib 44 and an interior contact rib 45 that are engaged with the door channel 5 which has an arc-shaped curved portion are formed on the interior side of the interior side wall 40 in the vicinity of the connection portion with the bottom wall 20. The interior side wall 40 is held by the curved door channel 5 by the interior holding lip 44 and the interior contact lip 45.

An interior cover lip 42 is formed on a side opposite to the interior seal lip 41 (interior side) of the tip end of the interior side wall 40. Although the interior cover lip 42 is depicted in a continuous shape from the interior seal lip 41 in the drawing, the present invention is not limited thereto. The interior cover lip 42 is in contact with a tip end of the door channel 5 to prevent rainwater, dust, and can prevent rainwater, dust, and noise from entering, thereby improving sealing performance.

As a result, the exterior sub-lip 33 is in contact with the inner surface of the exterior seal lip 31, and when the vehicle travels on a rough road or the like with the door glass 4 positioned slightly below the fully closed position and the door glass 4 vibrates, the exterior sub-lip 33 compensates for a force that the exterior seal lip 31 presses the door glass 4, and it is possible to prevent the door glass 4 side of the exterior seal lip 31 from being separated from the door glass 4 and prevent abnormal noise from being generated.

Figure 4:
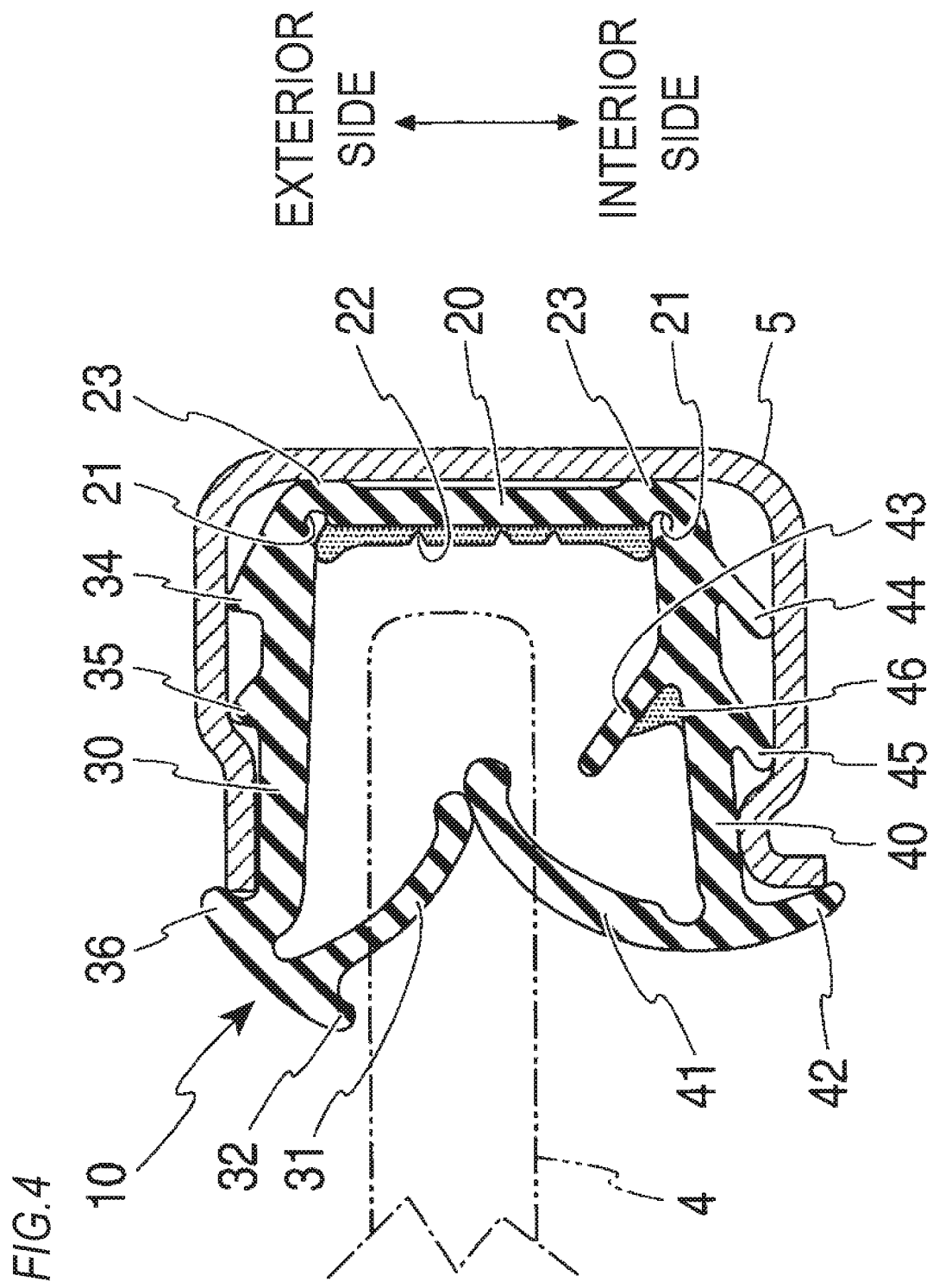
FIG. 4 is a cross-sectional view corresponding to line A-A of FIG. 2B, which is a glass run according to a second embodiment of the present invention.

FIG. 4 shows a second embodiment of the present invention, which is, instead of the exterior sub-lip 33 of the first embodiment, formed with a interior sub-lip 43 formed so as to project obliquely in a direction toward a base portion of the interior seal lip 41, which is formed on the tip end of the interior side wall 40, from the exterior side of the interior side wall 40 that is closer to the bottom wall 20 than the interior seal lip 41, the interior sub-lip 43 being formed with a thick portion 46 on a base portion thereof. The rest is the same as that of the first embodiment. The thick portion 46 of the base portion of the interior sub-lip 43 is formed to be thicker than an extruded portion interior sub-lip 47 (FIG. 7) formed on the third extruded portion 13 corresponding to the vertical frame portion on the rear side. The present embodiment is also in the vicinity of the connection portion between the vertical frame portion on the rear side of the second molded portion 15 and the corresponding third extruded portion 13.

As a result, when the vehicle travels on a rough road or the like with the door glass 4 positioned slightly below the fully closed position and the door glass 4 vibrates, the interior sub-lip 43 can prevent the exterior side of the interior seal lip 41 from being separated from the door glass 4 and prevent abnormal noise from being generated.

Further, since the thick portion 46 of the interior sub-lip 43 is thick, even if the interior sub-lip 43 is deteriorated, it is possible to prevent a reaction force (pressing force) toward the inner surface of the interior seal lip 41 from decreasing, and to prevent the interior seal lip 41 from being separated from the door glass 4 and prevent abnormal noise from being generated. FIG. 4 is illustrated in a manner emphasizing the thick portion so that it can be understood that the thick portion 46 of the interior sub-lip 43 is formed to be thicker than an extruded portion interior sub-lip 47 (FIG. 7) formed on the third extruded portion 13.

The interior sub-lip 43 serves for preventing the interior seal lip 41 from coming into close contact with the interior side wall 40 when the door glass 4 is greatly displaced toward the interior side in the body, so as to and prevent abnormal noise from being generated and to hold a side end portion of the door glass 4.

Figure 5:
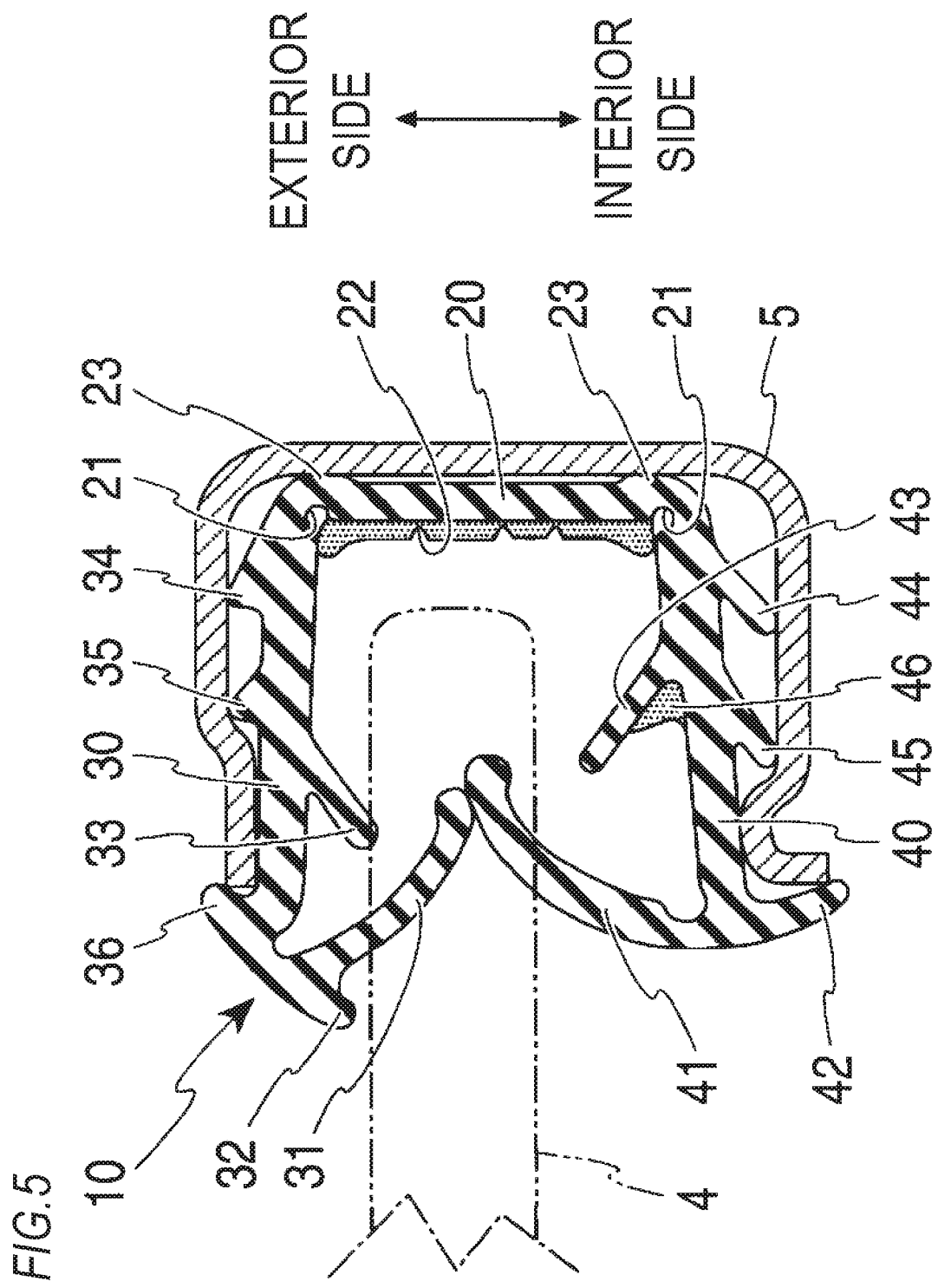
FIG. 5 is a cross-sectional view corresponding to line A-A of FIG. 2B, which is a glass run according to a third embodiment of the present invention.
Figure 6:
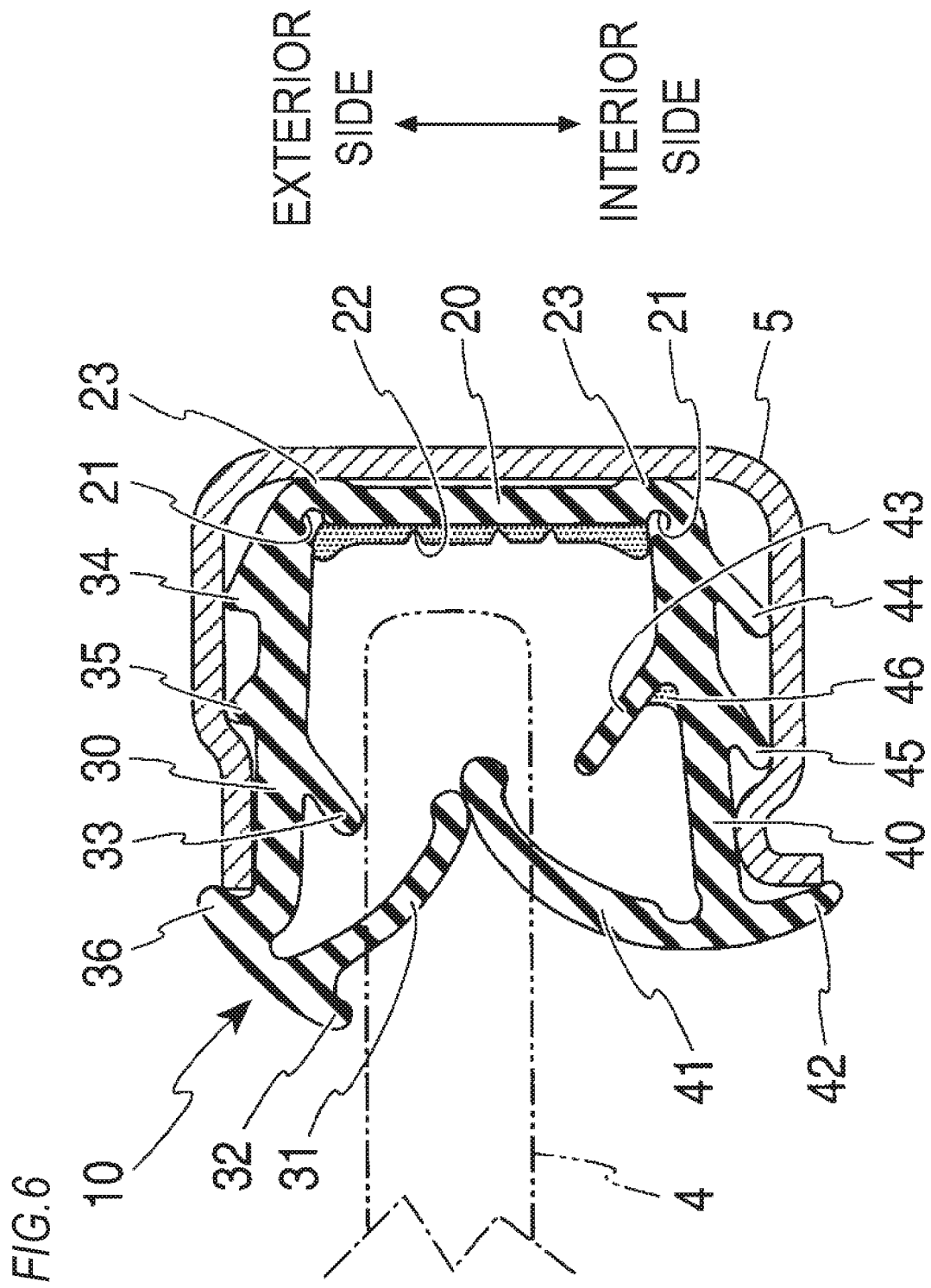
FIG. 6 is a cross-sectional view corresponding to line B-B of FIG. 2B, which is a glass run according to a third embodiment of the present invention.
Figure 7:
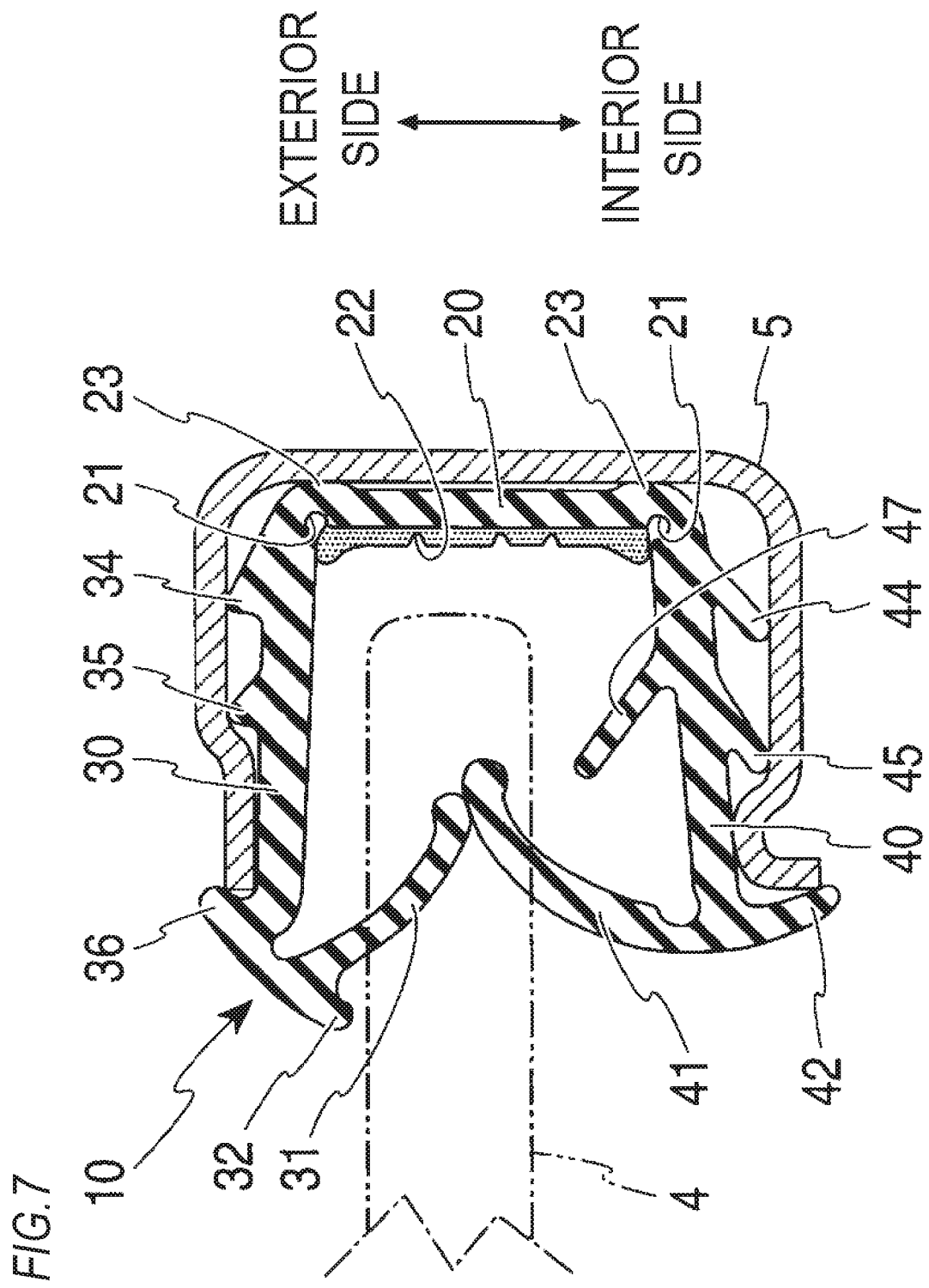
FIG. 7 is a cross-sectional view corresponding to line C-C of FIG. 2B, which is a glass run according to the third embodiment of the present invention.

FIGS. 5 to 7 show a third embodiment of the present invention, which includes both the exterior sub-lip 33 according to the first embodiment and the interior sub-lip 43 formed with the thick portion 46 according to the second embodiment. Further, upon molding, a formed portion of the present embodiment is formed in an area continuous with a molded portion and an extruded member connected to the molded portion.

FIG. 5 is the same position as FIGS. 3 and 4, which is in the vicinity of the connecting portion with the third extruded portion 13. As shown in FIG. 6, at a slightly lower position, regarding the exterior sub-lip 33 and the thick portion 46 of the interior sub-lip 43, toward the vehicle lower side, the exterior sub-lip 33 has a length shorter than that in FIG. 5, and the interior sub-lip 43 has a thickness of the thick portion 46 smaller than that in FIG. 5. Further, as shown in FIG. 7, at a further lower position, the exterior sub-lip 33 disappears, and the interior sub-lip 43 has a thickness the same as that of the extruded portion interior sub-lip 47 formed on the third extruded portion 13. FIG. 7 is a cross-sectional view of the third extruded portion 13.

As a result, the exterior sub-lip 33 compensates for a force that the exterior seal lip 31 presses the door glass 4 from the exterior side, and a force pushing the door glass 4 from the interior side is increased by the thick portion 46 of the interior sub-lip 43, so that the door glass 4 and the exterior seal lip 31 can be prevented from being instantaneously separated from each other when the door glass 4 vibrates. Further, since the interior sub-lip 43 has the thick portion 46 at the base portion thereof, even if the interior sub-lip 43 is deteriorated, it is possible to prevent a reaction force (pressing force) toward the inner surface of the interior seal lip 41 from decreasing, and to prevent the interior seal lip 41 from being separated from the door glass 4 and prevent abnormal noise from being generated.

Further, the exterior sub-lip 33, which is continuously formed on the mold portion and the extruded member connected to the molded portion, has a shorter projecting length, and the interior sub-lip 43 has a thickness of the thick portion 46 of the base portion decreased so as to be the same as the thickness of the extruded portion interior sub-lip 47 formed on the extruded member, when the door glass 4 is lifted or lowered, it is possible to prevent the exterior sub-lip 33 from appearing and disappearing abruptly, and to prevent the thickness of the interior sub-lip 43 from increasing or decreasing abruptly, thereby preventing behavior of the door glass 4 from becoming irregular and unstable.

Further, since the exterior sub-lip 33 and the thick portion 46 of the interior sub-lip 43 are continuously formed on the molded portion and the extruded member connected to the molded portion, it is not necessary to cope with formation thereof on the extruded member, which prevents weight increase and cost increase. In addition, when the exterior sub-lip 33 and the thick portion 46 of the interior sub-lip 43 are formed, it is not necessary to consider or study influence to other functions of the extruded member, which can shorten the development time.

Since the third embodiment includes both the exterior sub-lip 33 and the thick portion 46 of the interior sub-lip 43 and has increase forces pressing the door glass 4 from both sides, the exterior sub-lip 33 can be formed thinner than in the first embodiment, and the thickness of the thick portion 46 of the interior sub-lip 43 can be reduced as compared with the second embodiment.

Figure 8:
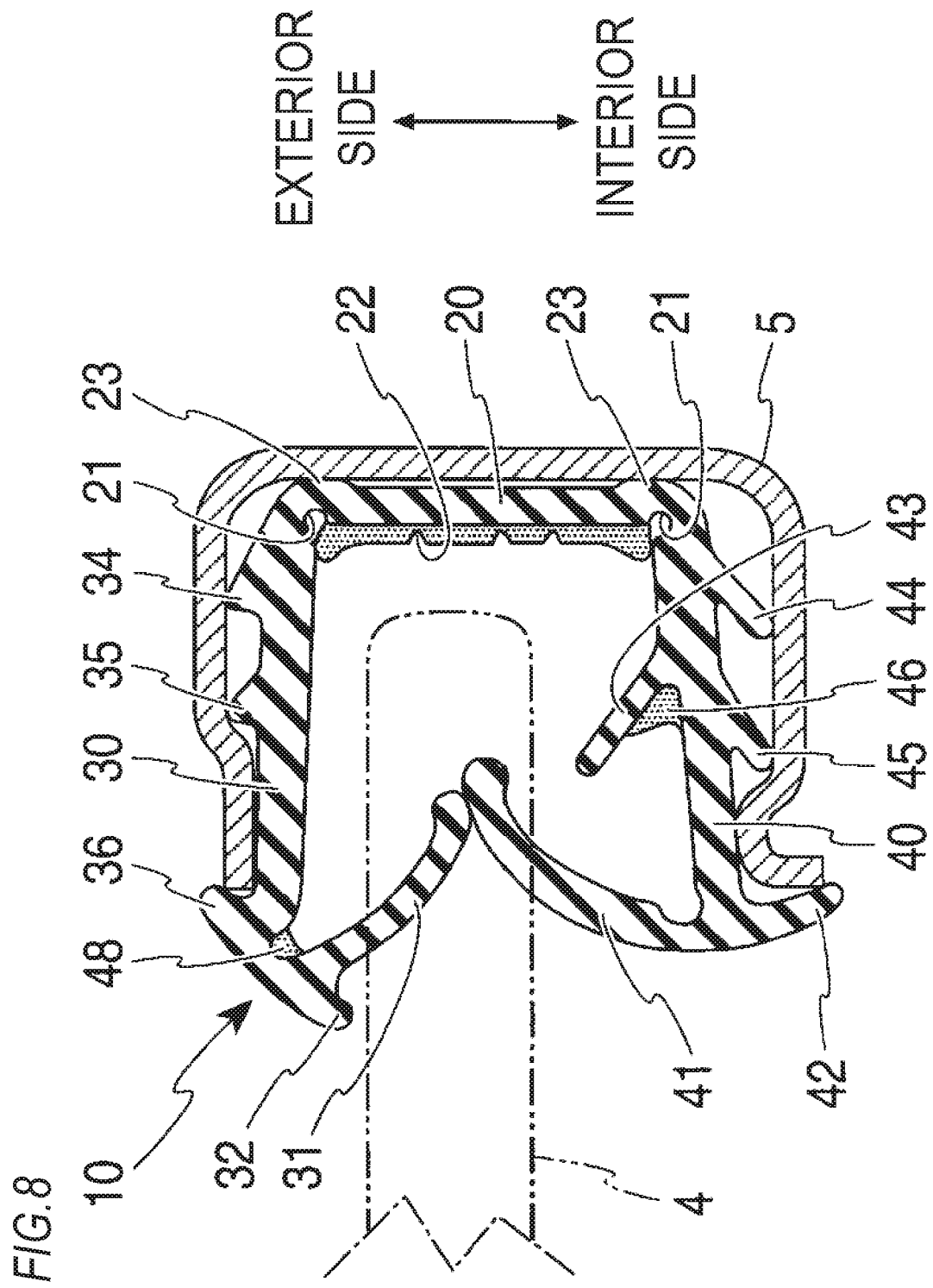
FIG. 8 is a cross-sectional view corresponding to line A-A of FIG. 2B, which is a glass run according to a fourth embodiment of the present invention.

FIG. 8 shows a fourth embodiment of the present invention, which includes a thick portion 48 formed on the base portion of the exterior seal lip 31 in addition to the second embodiment described above. Further, upon molding, a formed portion of the present embodiment is formed in an area continuous with a molded portion and an extruded member connected to the molded portion.

As a result, when the vehicle travels on a rough road or the like with the door glass 4 positioned slightly below the fully closed position and the door glass 4 vibrates, it is possible to prevent the door glass 4 side of the exterior seal lip 31 from being separated from the door glass 4, or to prevent the exterior side of the interior seal lip 41 from being separated from the door glass 4, thereby preventing abnormal noise from being generated.

Further, even if the interior sub-lip 43 and the exterior seal lip 31 are deteriorated, it is possible to prevent a reaction force (pressing force) to the door glass 4 of the interior sub-lip 43 toward the inner surface side of the door glass 4 and a reaction force (pressing force) of the of the exterior seal lip 31 toward the outer surface side of the door glass 4 from decreasing, and to prevent the exterior seal lip 31 and the interior seal lip 41 from being separated from the door glass 4 and prevent abnormal noise from being generated.

Since the fourth embodiment includes both the thick portion 48 formed on the base portion of the exterior seal lip 31 and the thick portion 46 of the interior sub-lip 43 and has increase forces pressing the door glass 4 from both sides, the thickness of the thick portion 46 of the interior sub-lip 43 can be reduced as compared with the second embodiment.

Figure 9:
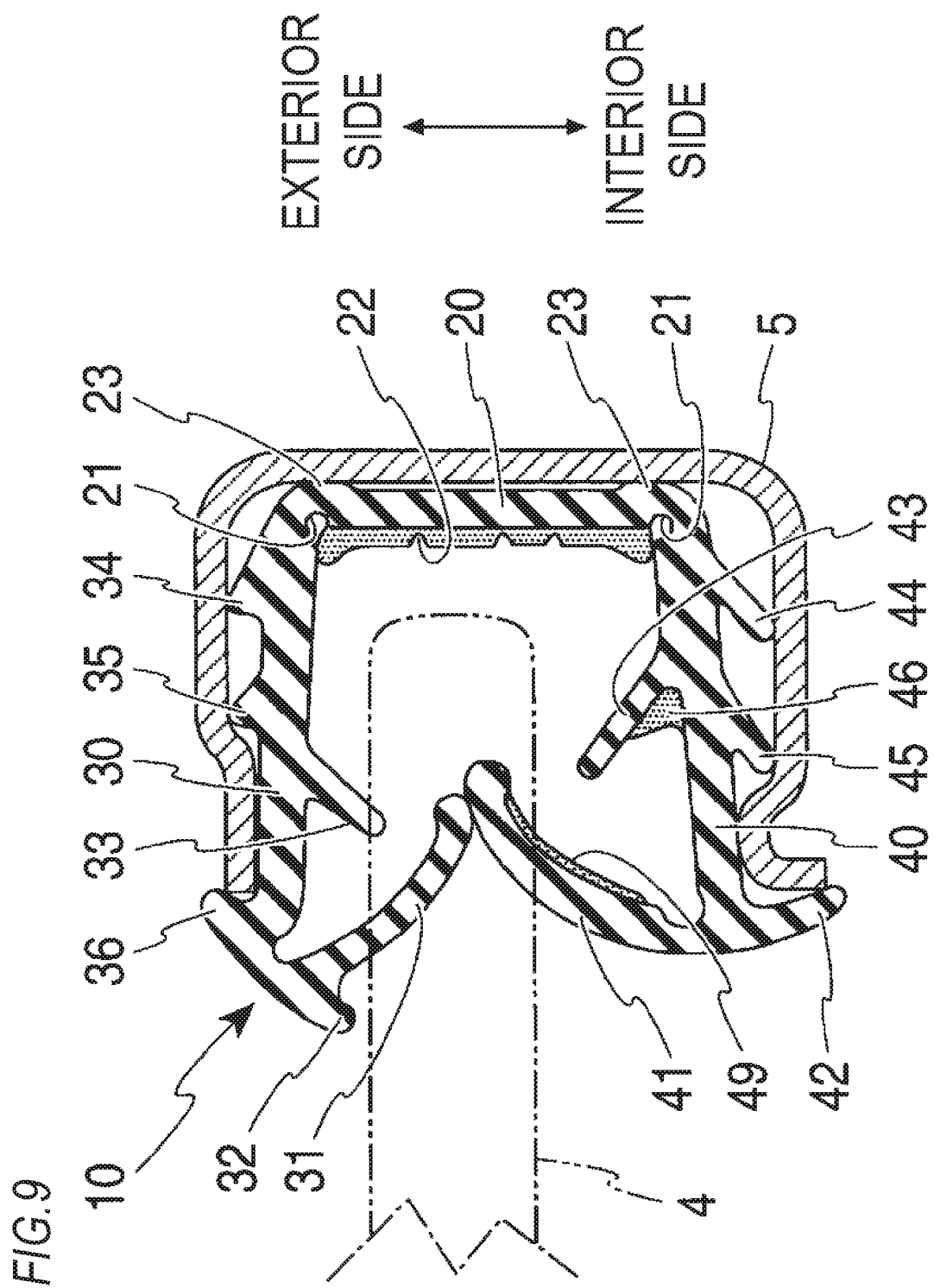
FIG. 9 is a cross-sectional view corresponding to line A-A of FIG. 2B, which is a glass run according to a fifth embodiment of the present invention.

FIG. 9 shows a fifth embodiment of the present invention, which includes a thick portion 49 formed on a side of the interior seal lip 41 that is not in contact with the door glass 4 in addition to the third embodiment described above. Further, upon molding, a formed portion of the present embodiment is formed in an area continuous with a molded portion and an extruded member connected to the molded portion.

As a result, when the vehicle travels on a rough road or the like with the door glass 4 positioned slightly below the fully closed position and the door glass 4 vibrates, the exterior sub-lip 33 compensates for the force that the exterior seal lip 31 presses the door glass 4 from the exterior side, and the thick portion 46 of the interior sub-lip 43 and the thick portion 49 of the interior seal lip 41 increase the force pushing the door glass 4 from the interior side, so that the door glass 4 and the exterior seal lip 31 can be prevented from being instantaneously separated from each other when the door glass 4 vibrates.

Further, since the interior sub-lip 43 has the thick portion 46 at the base portion thereof and the interior seal lip 41 has the thick portion 49 on the side thereof that is not in contact with the door glass 4, even if the interior seal lip 41 and the interior sub-lip 43 are deteriorated, it is possible to prevent the reaction force (pressing force) of the interior seal lip 41 toward the inner surface of the door glass 4 from decreasing, and to prevent the interior seal lip 41 from being separated from the door glass 4 and prevent abnormal noise from being generated.

Since the fifth embodiment includes the exterior sub-lip 33, the thick portion 46 of the interior sub-lip 43, and the thick portion 49 of the interior seal lip 41, and has increase forces pressing the door glass 4 from both sides, as compared with the third embodiment, the exterior sub-lip 33 can be formed further thinner, and the thickness of the thick portion 46 of the interior sub-lip 43 can be further reduced.

Figure 10:
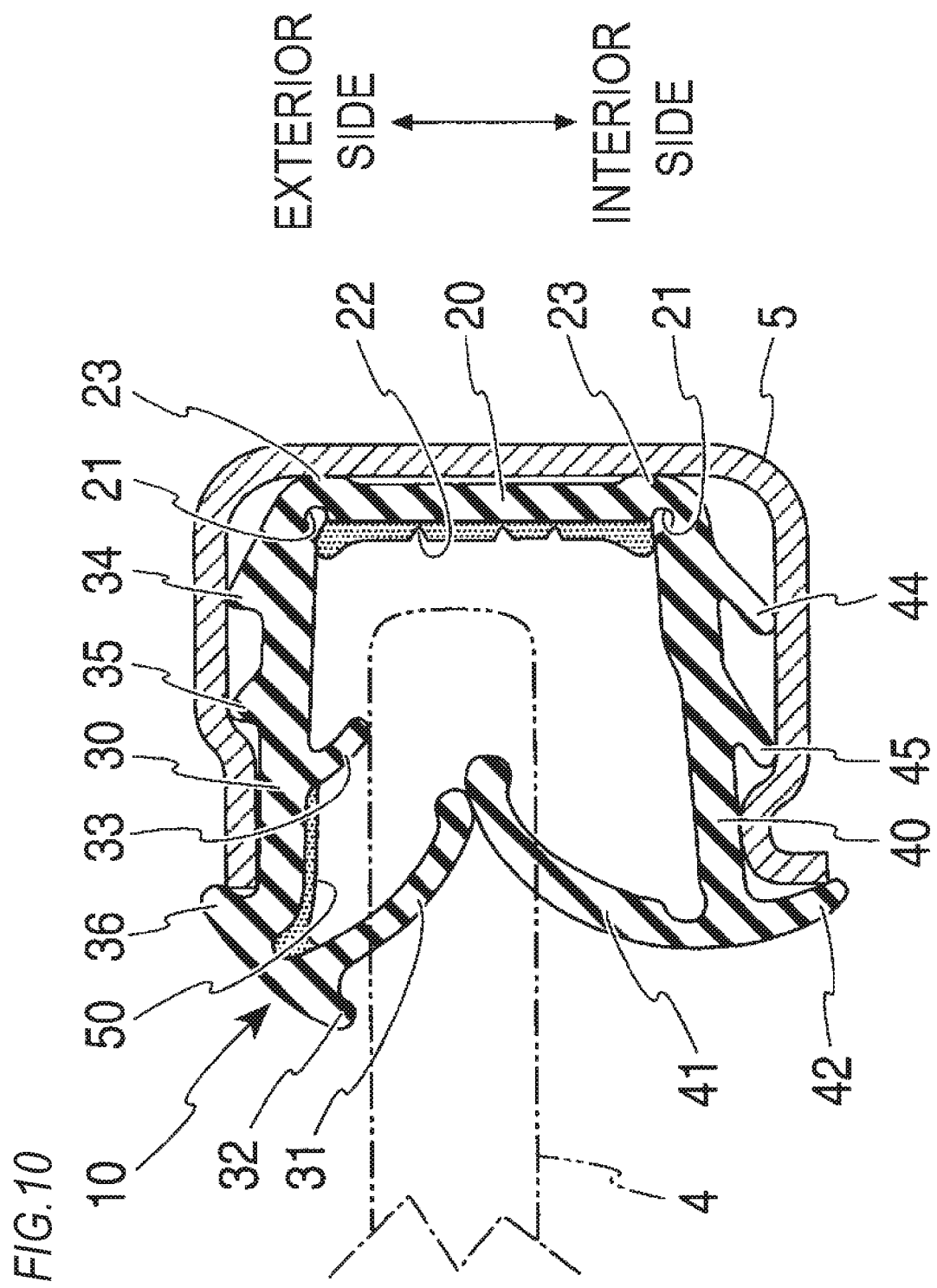
FIG. 10 is a cross-sectional view corresponding to line A-A of FIG. 2B, which is a glass run according to a sixth embodiment of the present invention.
Figure 11:
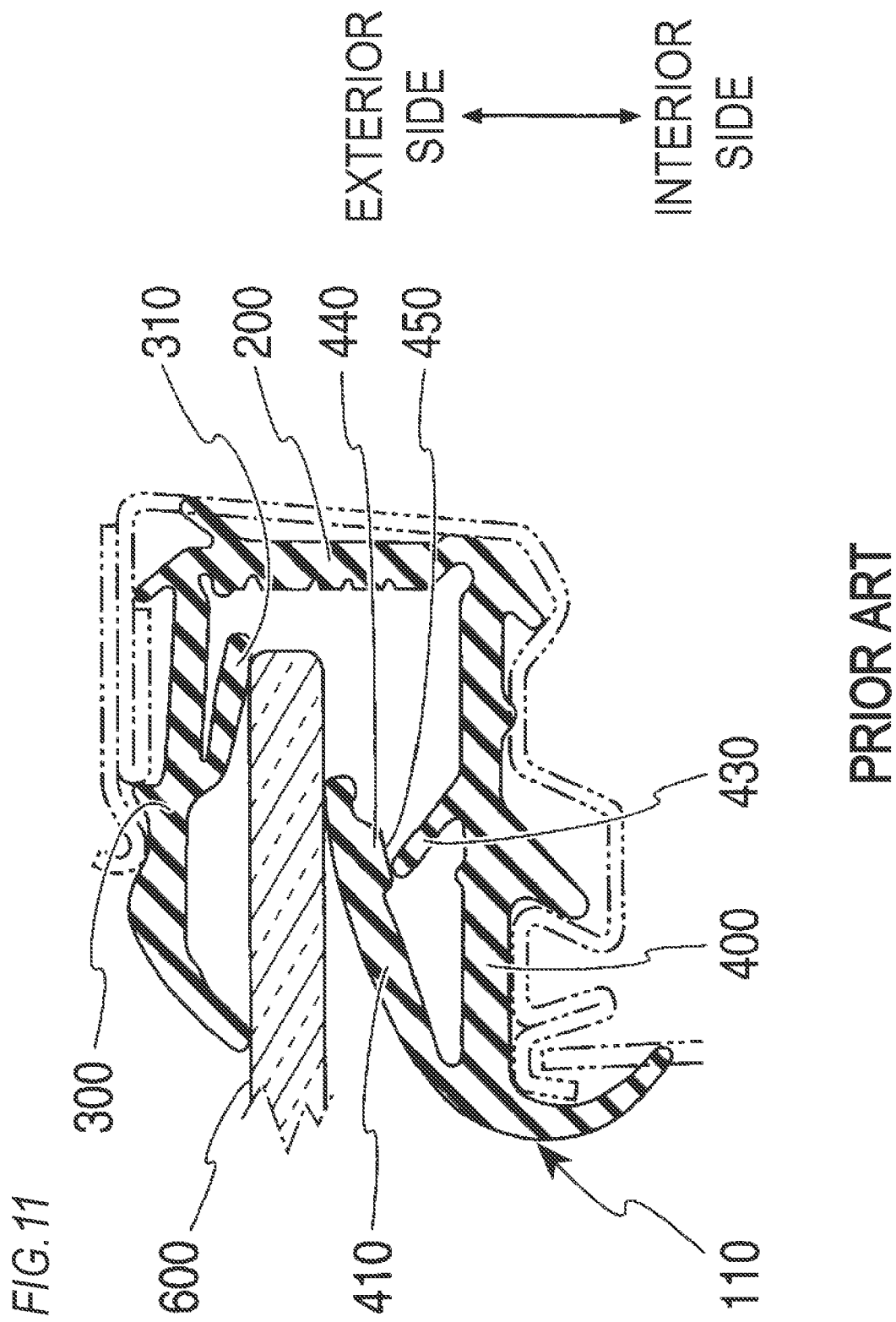
FIG. 11 is a cross-sectional view corresponding to line Y-Y in FIG. 1, which is a cross-sectional view showing an attachment structure of a glass run of related art.

FIG. 10 shows a sixth embodiment of the present invention, in which a thick portion 50 is formed on the exterior sub-lip 33 formed so as to project obliquely from the interior side of the exterior side wall 30 that is closer to the bottom wall 20 than the base portion of the exterior seal lip 31, and on the exterior side wall 30 from a base portion of the exterior sub-lip 33 to the base portion of the exterior seal lip 31. Further, upon molding, a formed portion of the present embodiment is formed in an area continuous with a molded portion and an extruded member connected to the molded portion.

As a result, the exterior sub-lip 33 and the thick portion 50 that is formed on the exterior side wall 30 from the base portion of the exterior sub-lip 33 to the base portion of the exterior seal lip 31 compensate for the force that the exterior seal lip 31 presses the door glass 4, and the exterior sub-lip 33 is projected toward the bottom wall 20, so that the door glass 4 and the exterior seal lip 31 can be prevented from being instantaneously separated from each other when the door glass 4 vibrates, without hindering smooth vertical movement of the door glass 4.

Further, even if the exterior seal lip 31 and the exterior sub-lip 33 are deteriorated, the thick portion 50 can prevent the reaction force (pressing force) toward the outer surface of door glass 4 from decreasing, and it is possible to prevent the exterior seal lip 31 from being separated from the door glass 4 and prevent abnormal noise from being generated.

In the embodiment of the invention, a material constituting the glass run 10 can be a rubber, a thermoplastic elastomer, a soft synthetic resin, or the like. An ethylene-propylene-diene rubber (EPDM) is preferable as the rubber, and an olefin-based thermoplastic elastomer (TPC) or a dynamically crosslinked thermoplastic elastomer (TPV) is preferable as the thermoplastic elastomer, in view of weather resistance, recycling, cost, and the like.

The implementation of the present invention is not limited to the embodiments described above, and various modifications can be made without departing from the object disclosed here.

In the third embodiment described above, disappearance of the exterior sub-lip 33 with respect to the exterior sub-lip 33 is the same as the position on the vehicle lower side at which the thickness becomes the same as that of the extruded portion interior sub-lip 47 formed on the third extruded portion 13 with respect to the interior sub-lip 43, whereas the positions thereof may be shifted from each other as well. The same applies to the fourth, fifth, and sixth embodiments and other combinations of the cases.

In the first and third embodiments described above, the exterior sub-lip 33 is illustrated with approximately the same thickness, but may also be illustrated with a thick base portion similar as the interior sub-lip 43 of the second embodiment. In this case, in view of preventing the reaction force (pressing force) of the exterior seal lip 31 toward the inner surface from decreasing even when the exterior sub-lip 33 is deteriorated, it is preferable to increase the thickness of the base portion side of the exterior seal lip 31 when the exterior sub-lip 33 is projected toward the base portion of the exterior seal lip 31, and to increase the thickness of the bottom wall 20 when the exterior sub-lip 33 is projected toward the bottom wall 20.

According to an aspect of the invention, there is provided a glass run including: a basic frame having a bottom wall, an exterior side wall, and an interior side wall; an exterior seal lip formed at or in the vicinity of a tip end of the exterior side wall; and an interior seal lip formed at or in the vicinity of a tip end of the interior side wall, the glass run configured to be attached to a groove portion formed in a door frame, the glass run comprising at least one of: an exterior sub-lip formed so as to project obliquely from an interior side of the exterior side wall that is closer to the bottom wall than a base portion of the exterior seal lip; an interior sub-lip formed so as to project obliquely in a direction toward a base portion of the interior seal lip from an exterior side of the interior side wall that is closer to the bottom wall than the base portion of the interior seal lip, the interior sub-lip formed with a thick portion on a base portion on a side of the interior seal lip; a thick portion formed on a base portion of the exterior seal lip; or a thick portion formed on a side of the interior seal lip that is not in contact with the door glass.

In the above-described invention, the glass run is inclusive of 15 cases in total, including: a first case including the exterior sub-lip formed so as to project obliquely from the interior side of the exterior side wall that is closer to the bottom wall than the base portion of the exterior seal lip; a second case including the interior sub-lip formed so as to project obliquely in the direction toward the base portion of the interior seal lip from the exterior side of the interior side wall that is closer to the bottom wall than the base portion of the interior seal lip, the interior sub-lip being formed with the thick portion on the base portion on the interior seal lip side; a third case including the thick portion formed on the base portion of the exterior seal lip; a fourth case including the thick portion formed on the side of the interior seal lip that is not in contact with the door glass; optional combinations of two cases among the four cases; optional combinations of three cases; and a combination of all the four cases.

In the first case including the exterior sub-lip formed so as to project obliquely from the interior side of the exterior side wall that is closer to the bottom wall than the base portion of the exterior seal lip, the exterior sub-lip compensates for a force that the exterior seal lip presses the door glass, and it is possible to prevent the door glass and the exterior seal lip from being instantaneously separated from each other when the door glass vibrates. A projecting direction of the exterior sub-lip may be toward the bottom wall or toward the base portion of the exterior seal lip.

In the second case formed the interior sub-lip formed so as to project obliquely in the direction toward the base portion of the interior seal lip from the exterior side of the interior side wall that is closer to the bottom wall than the base portion of the interior seal lip, the interior sub-lip being formed with the thick portion on the base portion on the interior seal lip side, since the thick portion is provided at the base portion of the interior sub-lip, a force that the interior sub-lip presses the door glass from the interior side increases, and it is possible to prevent the door glass and the exterior seal lip from being instantaneously separated from each other when the door glass vibrates.

Further, even if the interior sub-lip is deteriorated, it is possible to prevent a reaction force (pressing force) of the interior seal lip toward the inner surface from decreasing, and to prevent the interior seal lip from being separated from the door glass and prevent abnormal noise from being generated.

In the third case including the thick portion formed on the base portion of the exterior seal lip, a force that the exterior seal lip presses the door glass from the exterior side is increased due to the thick portion formed on the base portion of the exterior seal lip, and it is possible to prevent the door glass and the exterior seal lip from being instantaneously separated from each other when the door glass vibrates.

Further, even if the exterior seal lip is deteriorated, it is possible to prevent a reaction force (pressing force) of the exterior seal lip toward the door glass from decreasing due to the thick portion formed on the base portion of the exterior seal lip, and to prevent the exterior seal lip from being separated from the door glass and prevent abnormal noise from being generated.

In the fourth case including the thick portion formed on the side of the interior seal lip that is not in contact with the door glass, a force that the interior seal lip presses the door glass from the interior side is increased due to the thick portion, and it is possible to prevent the door glass and the exterior seal lip from being instantaneously separated from each other when the door glass vibrates.

Further, even if the interior seal lip is deteriorated, due to the thick portion formed on the side of the interior seal lip that is not in contact with the door glass, deformation of the interior seal lip is prevented, and it is possible to prevent a reaction force (pressing force) of the interior seal lip toward the door glass from decreasing, and to prevent the interior seal lip from being separated from the door glass and prevent abnormal noise from being generated.

The first to fourth cases or the combination methods of the four cases can be selected depending on various forms such as the size of the vehicle and the shape and size of the door glass, and the vibration state of the door glass in a state where the door glass is positioned slightly below the fully closed position.

A thick portion may be formed on a portion of the exterior side wall from a base portion of the exterior sub-lip to the base portion of the exterior seal lip. In the above-described invention, since the thick portion is formed on the portion of the exterior side wall from the base portion of the exterior sub-lip to the base portion of the exterior seal lip, a complementary force of the exterior sub-lip that complements the force that the exterior seal lip presses the door glass increases, and it is possible to prevent the door glass and the exterior seal lip from being instantaneously separated from each other when the door glass vibrates.

Further, even if the exterior sub-lip and the exterior seal lip are deteriorated, the thick portion can reduce the decrease of the force that the exterior seal lip presses the door glass and the complementary force of the exterior sub-lip that complements the force that the exterior seal lip presses the door glass, and thus it is possible to prevent the exterior seal lip from being separated from the door glass and prevent abnormal noise from being generated.

The exterior sub-lip may be projected toward the bottom wall. When the thick portion is formed on a portion of the exterior side wall from the base portion of the exterior sub-lip to the base portion of the exterior seal lip, a length of the exterior sub-lip on the exterior seal lip side is shorter than a length thereof on the bottom wall side. As a result, the exterior sub-lip becomes unlikely to bend toward the exterior seal lip, and if the exterior sub-lip is projected toward the base portion of the exterior seal lip, a force pushing the exterior seal lip toward the door glass is increased, which hinders smooth vertical movement of the door glass.

In the above-described invention, the exterior sub-lip, in which the thick portion is formed on the portion of the exterior side wall from the base portion of the exterior sub-lip to the base portion of the exterior seal lip, is projected toward the bottom wall, so that the exterior sub-lip is unlikely to bend and does not hinder smooth vertical movement of the door glass as compared to a case where the exterior sub-lip is projected toward the base portion of the exterior seal lip. Further, the exterior sub-lip compensates for the force that the exterior seal lip presses the door glass, and it is possible to prevent the door glass and the exterior seal lip from being instantaneously separated from each other when the door glass vibrates.

Further, even if the exterior sub-lip and the exterior seal lip are deteriorated, the thick portion can reduce the decrease of the force that the exterior seal lip presses the door glass and the complementary force of the exterior sub-lip that complements the force that the exterior seal lip presses the door glass, and thus it is possible to prevent the exterior seal lip from being separated from the door glass and prevent abnormal noise from being generated.

At least one of the exterior sub-lip, the thick portion formed on the interior sub-lip, the thick portion formed on the base portion of the exterior seal lip, the thick portion formed on the side of the interior seal lip that is not in contact with the door glass, or the thick portion formed on the portion of the exterior side wall from the base portion of the exterior sub-lip to the base portion of the exterior seal lip may be, upon molding in which a plurality of extruded members are connected, formed in a molded portion, or continuously formed on a molded portion and one of the extruded members connected to the molded portion.

In the above-described invention, at least one of the exterior sub-lip, the thick portion formed on the interior sub-lip, the thick portion formed on the base portion of the exterior seal lip, the thick portion formed on the side of the interior seal lip that is not in contact with the door glass, or the thick portion formed on the portion of the exterior side wall from the base portion of the exterior sub-lip to the base portion of the exterior seal lip is, upon molding in which the plurality of extruded members are connected, formed in the molded portion, or continuously formed on the molded portion and one of the extruded members connected to the molded portion, so that it is possible to cope with a concern about occurrence of abnormal noise at a specific portion by forming at least one of the foregoing at the portion.

In addition, since at least one of the foregoing is, upon molding in which the plurality of extruded members are connected, formed in the molded portion, or continuously formed on the molded portion and one of the extruded members connected to the molded portion, it is not necessary to cope with formation of at least one of the exterior sub-lip, the thick portion formed on the interior sub-lip, the thick portion formed on the base portion of the exterior seal lip, the thick portion formed on the side of the interior seal lip that is not in contact with the door glass, or the thick portion formed on the portion of the exterior side wall from the base portion of the exterior sub-lip to the base portion of the exterior seal lip, which prevents weight increase and cost increase.

Further, when the exterior sub-lip, the thick portion formed on the interior sub-lip, the thick portion formed on the base portion of the exterior seal lip, the thick portion formed on the side of the interior seal lip that is not in contact with the door glass, or the thick portion formed on the portion of the exterior side wall from the base portion of the exterior sub-lip to the base portion of the exterior seal lip is formed in one of the extruded members upon extrusion molding, it is not necessary to consider or study influence to other functions of the extruded members, which can shorten the development time.

In the exterior sub-lip, the thick portion formed on the interior sub-lip, the thick portion formed on the base portion of the exterior seal lip, the thick portion formed on the side of the interior seal lip that is not in contact with the door glass, or the thick portion formed on the portion of the exterior side wall from the base portion of the exterior sub-lip to the base portion of the exterior seal lip, the exterior sub-lip may have a shorter projecting length toward a vehicle lower side, and the thick portion formed on the interior sub-lip, the thick portion formed on the base portion of the exterior seal lip, the thick portion formed on the side of the interior seal lip that is not in contact with the door glass, or the thick portion formed on the portion of the exterior side wall from the base portion of the exterior sub-lip to the base portion of the exterior seal lip may have a thickness decreased toward the vehicle lower side so as to be the same as a thickness of an extruded member.

In the above-described invention, the exterior sub-lip has a shorter projecting length toward the vehicle lower side, so that when the glass is lifted or lowered, it is possible to prevent the exterior sub-lip from appearing or disappearing abruptly, thereby preventing behavior of the glass from becoming irregular and unstable.

On the other hand, in the thick portion of the interior sub-lip, the thick portion formed on the base portion of the exterior seal lip, the thick portion formed on the side of the interior seal lip that is not in contact with the door glass, or the thick portion formed on the portion of the exterior side wall from the base portion of the exterior sub-lip to the base portion of the exterior seal lip, the thick portion is decreased so as to be the same as a thickness of the base portion of the interior sub-lip, the interior seal lip, or the exterior side wall of the extruded portion formed on the extruded. members, so that when the glass is lifted or lowered, it is possible to prevent the thickness of the interior sub-lip, the interior seal lip, or the exterior side wall from increasing or decreasing abruptly, thereby preventing behavior of the glass from becoming irregular and unstable.

At least one of the exterior sub-lip, the thick portion formed on the interior sub-lip, the thick portion formed on the base portion of the exterior seal lip, the thick portion formed on the side of the interior seal lip that is not in contact with the door glass, or the thick portion formed on the portion of the exterior side wall from the base portion of the exterior sub-lip to the base portion of the exterior seal lip may be partially formed.

In the above-described invention, at least one of the exterior sub-lip, the thick portion formed on the interior sub-lip, the thick portion formed on the base portion of the exterior seal lip, the thick portion formed on the side of the interior seal lip that is not in contact with the door glass, or the thick portion formed on the portion of the exterior side wall from the base portion of the exterior sub-lip to the base portion of the exterior seal lip is partially formed, so that it is possible to prevent generation of tapping noise (abnormal noise) between the door glass and the seal lips and to reduce the weight.

In the first case including the exterior sub-lip formed so as to project obliquely from the interior side of the exterior side wall that is closer to the bottom wall than the base portion of the exterior seal lip formed at or in the vicinity of the tip end of the exterior side wall, the exterior sub-lip compensates for the force that the exterior seal lip presses the door glass, and it is possible to prevent the door glass and the exterior seal lip from being instantaneously separated from each other when the door glass vibrates.

In the second case formed with the interior sub-lip formed so as to project obliquely in the direction toward the base portion of the interior seal lip from the exterior side of the interior side wall that is closer to the bottom wall than the base portion of the interior seal lip formed at or in the vicinity of the tip end of the interior side wall, the interior sub-lip being formed with the thick portion on the base portion on the interior seal lip side, since the thick portion is provided at the base portion of the interior sub-lip, the force that the interior sub-lip presses the door glass from the interior side increases, and it is possible to prevent the door glass and the exterior seal lip from being instantaneously separated from each other when the door glass vibrates.

Further, even if the interior sub-lip is deteriorated, it is possible to prevent the reaction force (pressing force) of the interior seal lip toward the inner surface from decreasing, and to prevent the interior seal lip from being separated from the door glass and prevent abnormal noise from being generated.

In the third case including the thick portion formed on the base portion of the exterior seal lip, a force that the exterior seal lip presses the door glass from the exterior side is increased due to the thick portion, and it is possible to prevent the door glass and the exterior seal lip from being instantaneously separated from each other when the door glass vibrates. Further, even if the exterior seal lip is deteriorated, it is possible to prevent the reaction force (pressing force) of the exterior seal lip toward the door glass from decreasing due to the thick portion formed on the base portion of the exterior seal lip, and to prevent the exterior seal lip from being separated from the door glass and prevent abnormal noise from being generated.

In the fourth case including the thick portion formed on the side of the interior seal lip that is not in contact with the door glass, the force that the interior seal lip presses the door glass from the interior side is increased due to the thick portion, and it is possible to prevent the door glass and the exterior seal lip from being instantaneously separated from each other when the door glass vibrates.

Further, even if the interior seal lip is deteriorated, due to the thick portion formed on the side of the interior seal lip that is not in contact with the door glass, deformation of the interior seal lip is prevented, and it is possible to prevent the reaction force (pressing force) of the interior seal lip toward the door glass from decreasing, and to prevent the interior seal lip from being separated from the door glass and prevent abnormal noise from being generated.

In cases where any two cases are combined, three cases are combined, and all of the cases are combined and all of the cases are combined as well, the aforementioned solution is taken against vibration of the door glass, so that it is possible to prevent the exterior seal lip and the interior seal lip from being separated from the door glass and to prevent abnormal noise from being generated. Further, even if the exterior seal lip and the interior seal lip are deteriorated, it is possible to prevent the reaction force (pressing force) toward the door glass from decreasing, and to prevent the exterior seal lip and the interior seal lip from being separated from the door glass and prevent abnormal noise from being generated.

The invention claimed is:

1. A glass run including: a basic frame having a bottom wall, an exterior side wall, and an interior side wall; an exterior seal lip formed at or in the vicinity of a tip end of the exterior side wall; and an interior seal lip formed at or in the vicinity of a tip end of the interior side wall, the glass run configured to be attached to a groove portion formed in a door frame, the glass run comprising:

an interior sub-lip formed so as to project obliquely in a direction toward a tip portion of the interior seal lip from an exterior side of the interior side wall that is closer to the bottom wall than a base portion of the interior seal lip, the interior sub-lip formed with a first thick portion only on a base portion on a side of the interior sub-lip that is closest to the interior seal lip, the base portion of the interior sub-lip being a portion of the interior sub-lip that is proximal to the interior side wall;

a first extruded portion, a second extruded portion, and a third extruded portion, each of which supports the door glass from different directions;

a first molded portion which connects the first extruded portion to the second extruded portion; and a second molded portion which connects the first extruded portion to the third extruded portion, wherein the interior sub-lip and the first thick portion are formed at a connection portion connecting the second molded portion and the third extruded portion.

2. The glass run according to claim 1, wherein a fourth thick portion is formed on a portion of the exterior side wall from a base portion of an exterior sub-lip formed so as to project obliquely from an interior side of the exterior side wall that is closer to the bottom wall than a base portion of the exterior seal lip to the base portion of the exterior seal lip.

3. The glass run according to claim 2, wherein the exterior sub-lip is projected toward the bottom wall.

4. The glass run according to claim 1, wherein at least one of an exterior sub-lip formed so as to project obliquely from an interior side of the exterior side wall that is closer to the bottom wall than a base portion of the exterior seal lip, the first thick portion formed on the interior sub-lip, a second thick portion formed only on the base portion of the exterior seal lip, a third thick portion formed on the side of the interior seal lip that is not in contact with the door glass, or a fourth thick portion formed on the portion of the exterior side wall from the base portion of the exterior sub-lip to the base portion of the exterior seal lip is, upon molding in which a plurality of extruded members are connected, formed in a molded portion, or continuously formed on a molded portion and one of the extruded members connected to the molded portion.

5. The glass run according to claim 1, wherein in an exterior sub-lip formed so as to project obliquely from an interior side of the exterior side wall that is closer to the bottom wall than a base portion of the exterior seal lip, the first thick portion formed on the interior sub-lip, a second thick portion formed only on the base portion of the exterior seal lip, a third thick portion formed on the side of the interior seal lip that is not in contact with the door glass, or a fourth thick portion formed on the portion of the exterior side wall from the base portion of the exterior sub-lip to the base portion of the exterior seal lip, the exterior sub-lip has a shorter projecting length toward a vehicle lower side, and the first thick portion formed on the interior sub-lip, the second thick portion formed only on the base portion of the exterior seal lip, the third thick portion formed on the side of the interior seal lip that is not in contact with the door glass, or the fourth thick portion formed on the portion of the exterior side wall from the base portion of the exterior sub-lip to the base portion of the exterior seal lip has a thickness decreased toward the vehicle lower side so as to be the same as a thickness of an extruded member.

* * * * *